(12) United States Patent
Jiang et al.

(10) Patent No.: US 9,471,184 B2
(45) Date of Patent: Oct. 18, 2016

(54) INPUTTING FINGERTIP SLEEVE

(75) Inventors: Kai-Li Jiang, Beijing (CN);
Shou-Shan Fan, Beijing (CN)

(73) Assignees: Tsinghua University, Beijing (CN);
HON HAI PRECISION INDUSTRY CO., LTD., New Taipei (TW)

( * ) Notice: Subject to any disclaimer, the term of this patent is extended or adjusted under 35 U.S.C. 154(b) by 1061 days.

(21) Appl. No.: 13/335,012

(22) Filed: Dec. 22, 2011

(65) Prior Publication Data

US 2012/0159687 A1 Jun. 28, 2012

Related U.S. Application Data

(63) Continuation of application No. 13/326,677, filed on Dec. 15, 2011.

(30) Foreign Application Priority Data

Dec. 27, 2010 (CN) .......................... 2010 1 0607321
Dec. 27, 2010 (CN) .......................... 2010 1 0607405
Dec. 27, 2010 (CN) .......................... 2010 1 0607441
Dec. 27, 2010 (CN) .......................... 2010 1 0607443
Dec. 27, 2010 (CN) .......................... 2010 1 0607445
Dec. 27, 2010 (CN) .......................... 2010 1 0607457

(51) Int. Cl.
*G09G 5/00* (2006.01)
*G06F 3/033* (2013.01)
(Continued)

(52) U.S. Cl.
CPC ............... *G06F 3/044* (2013.01); *B82Y 10/00* (2013.01); *B82Y 30/00* (2013.01); *D03D 1/0088* (2013.01); *G06F 3/03545* (2013.01);
(Continued)

(58) Field of Classification Search
CPC ....... B82Y 15/00; B82Y 30/00; B82Y 10/00;
G06F 2203/0331; G06F 3/014; G06F 3/033;
G06F 3/044; Y10S 977/742; Y10S 977/762;
Y10S 977/734; Y10S 977/753; Y10S
977/778; Y10S 977/847; Y10S 977/842;
A41D 13/087; H01L 51/0048; H01L 29/1606
USPC ...................................................... 2/21, 163
See application file for complete search history.

(56) References Cited

U.S. PATENT DOCUMENTS 5,640,713 A * 6/1997 Ping ..................... A41D 13/087
15/227
5,747,748 A * 5/1998 Zigler .................... B43K 23/10
178/18.01

(Continued)

FOREIGN PATENT DOCUMENTS

| CN | 201302702 | 9/2009 |
| CN | 201348771 | 11/2009 |

OTHER PUBLICATIONS

NPL—"Insulation". <URL: http://autocww2.colorado.edu/~blackmon/E64ContentFiles/Physics-Mechanics,Etc./Insulation.html> Published: Feb. 1, 2001. Accessed online: Jun. 22, 2015.*

*Primary Examiner* — Alissa L Hoey
*Assistant Examiner* — Jameson Collier
(74) *Attorney, Agent, or Firm* — Zhigang Ma

(57) ABSTRACT

An inputting fingertip includes a sleeve and an inputting end. The inputting end is located on the sleeve. The inputting end includes a supporter and a conductive layer. The conductive layer is located on a surface of the supporter. The conductive layer includes a carbon nanotube structure. The carbon nanotube structure is a substantially pure structure of carbon nanotubes and comprises a plurality of carbon nanotubes.

19 Claims, 29 Drawing Sheets

(51) Int. Cl.
*G06F 3/044* (2006.01)
*B82Y 10/00* (2011.01)
*B82Y 30/00* (2011.01)
*G06F 3/0354* (2013.01)
*D03D 1/00* (2006.01)
*A41D 13/08* (2006.01)

(52) U.S. Cl.
CPC .... *A41D 13/087* (2013.01); *G06F 2203/0331* (2013.01); *Y10S 977/742* (2013.01); *Y10T 428/13* (2015.01); *Y10T 428/1362* (2015.01)

(56) References Cited

U.S. PATENT DOCUMENTS

| | | | | |
|---|---|---|---|---|
| 6,128,004 | A * | 10/2000 | McDowall et al. | 345/158 |
| 7,008,563 | B2 * | 3/2006 | Smalley et al. | 252/511 |
| 7,071,258 | B1 * | 7/2006 | Jang et al. | 524/496 |
| 7,316,034 | B1 * | 1/2008 | Berry et al. | 2/21 |
| 7,884,797 | B1 * | 2/2011 | Ning | 345/156 |
| 8,739,315 | B2 * | 6/2014 | Baacke | A41D 1/005 2/160 |
| 2003/0005549 | A1 * | 1/2003 | DeLuca et al. | 16/430 |
| 2003/0096104 | A1 * | 5/2003 | Tobita | B82Y 30/00 428/332 |
| 2005/0062730 | A1 * | 3/2005 | Birecki | G06F 3/03545 345/179 |
| 2005/0066404 | A1 * | 3/2005 | Barker | 2/20 |
| 2005/0095938 | A1 * | 5/2005 | Rosenberger et al. | 442/194 |
| 2005/0184641 | A1 * | 8/2005 | Armitage | B82Y 10/00 313/495 |
| 2005/0231471 | A1 * | 10/2005 | Mallard et al. | 345/156 |
| 2006/0175601 | A1 * | 8/2006 | Lieber | B82Y 10/00 257/19 |
| 2007/0245454 | A1 * | 10/2007 | Eklund | G06F 3/014 2/161.6 |
| 2008/0170982 | A1 * | 7/2008 | Zhang et al. | 423/447.3 |
| 2008/0282446 | A1 * | 11/2008 | Komlos | 2/167 |
| 2008/0292840 | A1 * | 11/2008 | Majumdar | B32B 3/14 428/114 |
| 2009/0066658 | A1 * | 3/2009 | Earl | G06F 3/039 345/173 |
| 2009/0183297 | A1 * | 7/2009 | Drosihn | 2/167 |
| 2010/0090966 | A1 * | 4/2010 | Gregorio | 345/173 |
| 2011/0016609 | A1 * | 1/2011 | Phelps et al. | 2/162 |
| 2011/0047672 | A1 * | 3/2011 | Hatfield | 2/163 |
| 2011/0277215 | A1 * | 11/2011 | Lee et al. | 2/163 |
| 2013/0027362 | A1 * | 1/2013 | Lee et al. | 345/179 |

* cited by examiner

INPUTTING FINGERTIP SLEEVE

This application is a continuation application of U.S. patent application Ser. No. 12/326,677, filed on Dec. 15, 2011, entitled "INPUTTING FINGERTIP SLEEVE," which claims all benefits accruing under 35 U.S.C. §119 from China Patent Application No. 201010607405.3, filed on Dec. 27, 2010; No 201010607457.0, filed on Dec. 27, 2010; No. 201010607321.X, filed on Dec. 27, 2010; No. 201010607443.9, filed on Dec. 27, 2010; No. 201010607445.8, filed on Dec. 27, 2010; and No. 201010607441.X, filed on Dec. 27, 2010, in the China Intellectual Property Office, the disclosures of which are incorporated herein by reference.

BACKGROUND

1. Technical Field

The disclosure relates to inputting fingertip sleeves.

2. Description of Related Art

Digital devices using touch panel such as computers, mobile phones, are becoming increasingly popular. Typically, consumers can operate the touch panel by bare fingers. However, there are some disadvantages of operating touch panels with bare fingers directly. First, the skin on fingers naturally has oil and may leave a greasy print on the touch panel screen. Second, some touch panel screens, such as mobile phones are small in size, thus incorrect manipulations are often made with bare fingers because the keypads shown in the touch panel screen are very small.

What is needed, therefore, is an inputting fingertip sleeve that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
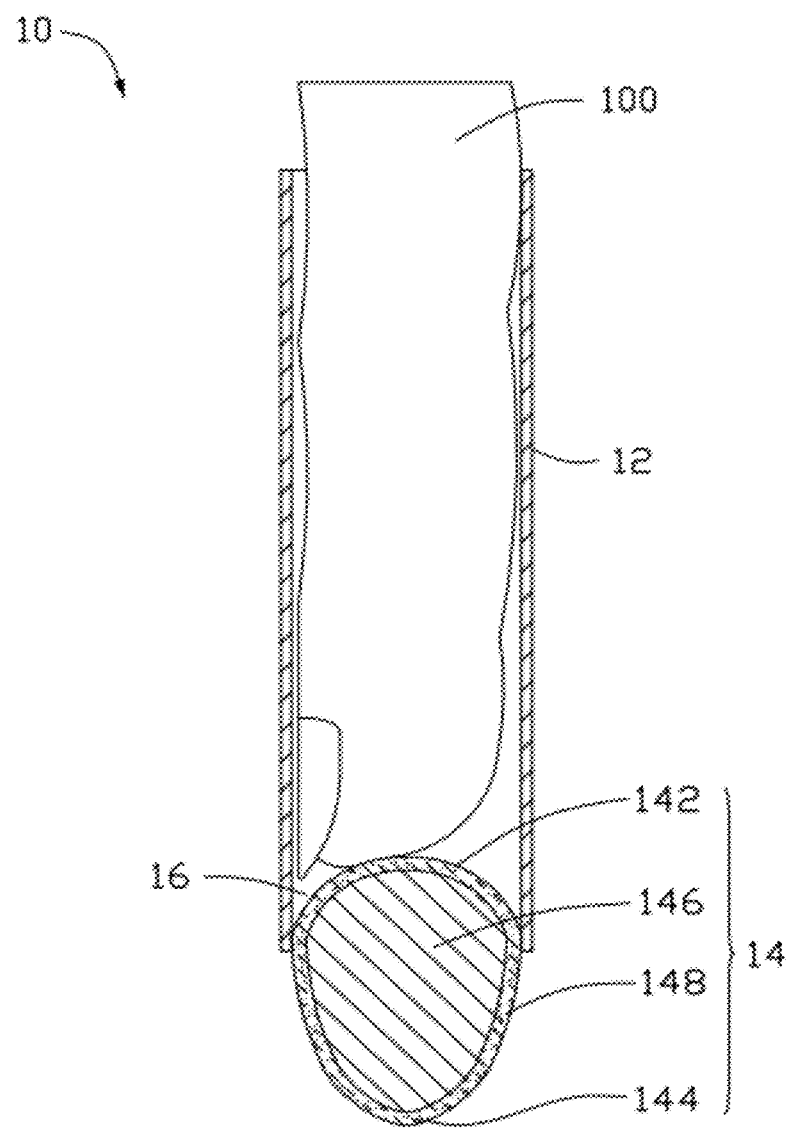
FIG. 1 is a schematic sectional view of an inputting fingertip sleeve according to one embodiment.

Referring to FIG. 1, one embodiment of an inputting fingertip sleeve 10 is provided. The inputting fingertip sleeve 10 includes a sleeve 12 and an inputting end 14. The inputting end 14 is connected with the sleeve 12.

The sleeve 12 is used to fix the inputting fingertip sleeve 10 on a finger 100. The sleeve 12 includes at least one open to conceive the finger 100. A shape of the sleeve 12 can be tubular, annular or "C"-shaped. The finger 100 is electrically connected with the inputting end 14. For example, the finger 100 directly contacts the inputting end 14, the finger 100 is electrically connected with the inputting end 14 via the sleeve 12. In the embodiment according to FIG. 1, the finger 100 contacts the inputting end 14. The finger 100 can be, for example, an index finger of a user. A material of the sleeve 12 can be conductive material or insulative material. The material of the sleeve 12 can be elastic. When the material of sleeve 12 is elastic, the sleeve 12 can have a size smaller than the finger 100, and sleeve 12 can be put on the finger 100. The conductive material can be metal, alloy or conductive polymer. The insulative material can be resin, rubber, plastic, or flexible fiber. In one embodiment according to FIG. 1, the sleeve 12 has a tubular shape including a first end and a second end (not labeled) opposite with the first end. The inputting end 14 is located at the first end or the second end. In one embodiment, the inputting end 14 can be movably connected with the first end or the second end. That is, the inputting end 14 can be separated from the sleeve. In another embodiment, the inputting end 14 is fixed at the first end or the second end. The sleeve 12 is dimensioned to fit the finger 100. In one embodiment, an inner diameter of the finger 100 can be in a range from about 4.5 centimeters to about 5.5 centimeters. In one embodiment, the material of the sleeve 12 is flexible rubber. A thickness of the sleeve 12 can be in a range from about 0.1 millimeters to about 2 millimeters.

The inputting end 14 is used to input signals on a touch screen, especially on a capacitive touch screen. The inputting end 14 can be electrically connected with the finger 100 directly or via the sleeve 12. A shape of the inputting end 14 can be round, tapered or oval-shaped. The inputting end 14 can be fixed on the sleeve 12 by an adhesive. The inputting end 14 and the sleeve 12 can be connected with each other via bolts, clips or other mechanical method. In one embodiment according to FIG. 1, the inputting end 14 is fixed on one open end of the sleeve 12 via adhesive. The inputting end 14 includes a first part 142 and a second part 144. The first part 142 can be located in the sleeve 12 and is configured to contact with the finger 100. The second part 144 is configured to contact the touch screen. The second part 144 can include a tip used to press little buttons. In other embodiments, a small gap 16 can be located between the first part 142 and an inner surface of the sleeve 12. The gap 16 is used to set a fingernail, as shown in FIG. 1. In one embodiment, the whole body of the inputting end 14 can be made of conductive materials. In another embodiment, an outer surface of the inputting end 14 can be made of conductive materials. The inputting end 14 can have a hollow structure. The inputting end 14 can be rigid or flexible. If the inputting end 14 is flexible, the touch screen will not be damaged when the inputting end 14 contacts the touch screen.

In the embodiment according to FIG. 1, the inputting end 14 includes a supporter 146 and a conductive layer 148. The conductive layer 148 covers the supporter 146 and is located on an outer surface of the supporter 146. Furthermore, the supporter 146 can be surrounded and sealed by the conductive layer 148. The supporter 146 can have a hollow structure or a solid structure. A material of the supporter 146 can be rigid or flexible. The rigid material can be ceramic, glasses, rigid resin, silicon or silicon dioxide. The flexible material can be flexible resin, rubber, plastic or fiber. In the embodiment according to FIG. 1, the material of the supporter 146 has a solid structure and is made of conductive polymer. Conductive polymer has high specific inductive capacity (SIC), if the conductive polymer is used as the supporter 146, the inputting end 14 can have a high capacity. The conductive polymer can be polyaniline, polypyrrole or polythiophene. The supporter 146 can be a hollow structure filled with liquid material. The hollow structure can be formed by a thin flexible film. The liquid material can be water, oil, or any other liquid material. When the supporter 146 is the hollow structure filled with liquid water, the supporter 146 can be flexible.

The conductive layer 148 is made of conductive material. The conductive layer 148 is used to transmit current signals, and make the inputting fingertip sleeve 10 input signals on the touch screen. When the inputting fingertip sleeve 10 is used, the conductive layer 148 is electrically connected with the finger 100.

Figure 2:
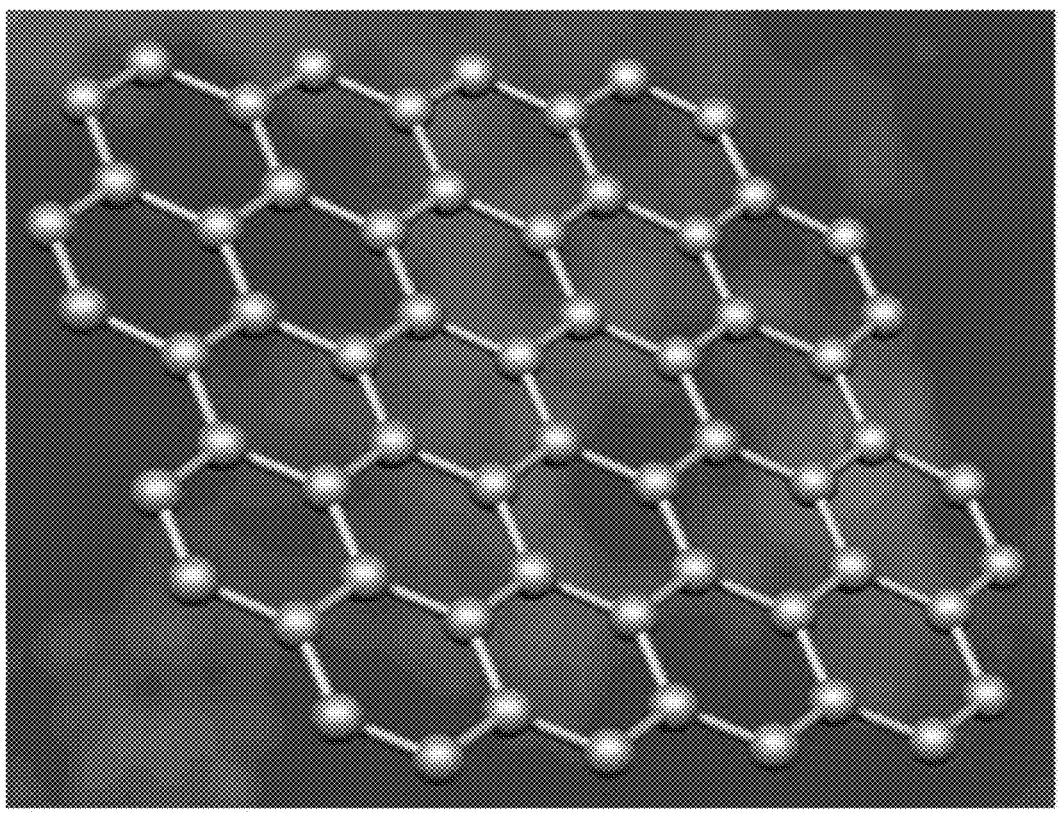
FIG. 2 is a schematic view of a graphene used as a conductive layer of one embodiment.

The conductive layer 148 can be a carbon structure. The carbon structure comprises a plurality of graphenes, a plurality of carbon nanotubes or combination thereof. Referring to FIG. 2, the graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 microns (e.g., 1 micron). A thickness of graphene can be less than 100 nanometers. In one embodiment, the thickness of graphene can be in a range from about 0.5 nanometers to about 100 nanometers. The carbon nanotube is a tube structure having diameter less than 200 nanometers. Particularly, the diameter of the carbon nanotube is in a range from 0.5 nanometers to about 50 nanometers. The carbon nanotubes can be single-walled, double-walled, and/or multi-walled carbon nanotubes. Carbon nanotubes and graphene are both micro structures and have good conductivity.

In one embodiment, the conductive layer 148 is a graphene layer structure. The graphene layer includes at least one graphene. In one embodiment, the graphene layer is a pure structure of graphenes. The graphene layer structure can include a single graphene or a plurality of 1 graphenes. In one embodiment, the graphene layer includes a plurality of graphenes, the plurality of graphenes are stacked with each other and/or located side by side. The plurality of graphenes is combined with each other by van der Waals attractive force. The graphene layer can be a continuous integrated structure. The term "continuous integrated structure" can be defined as a structure that is combined by a plurality of chemical covalent bonds (e.g., $sp^2$ bonds, $sp^1$ bonds, or $sp^3$ bonds) to form an overall structure. A thickness of the graphene layer can be less than 1 millimeter. Because graphene is nanomaterial with small size, the graphene layer can be fixed on the surface of the supporter 146 via van der Waals attractive force. In other embodiments, the graphene layer can be fixed on the surface of the supporter 146 via conducive adhesive. The graphene has large specific surface, and if the graphene layer is used as the conductive layer 148, a large capacity can be formed between the inputting fingertip sleeve 10 and the touch screen, as such, a sensitivity of the inputting fingertip sleeve 10 can be improved. Furthermore, the surface of the graphene is very smooth, so the inputting end 14 will not damage the touch screen when the conductive layer 148 glides along the touch screen.

In another embodiment, the conductive layer 148 can be a carbon nanotube structure. The carbon nanotube structure includes a plurality of carbon nanotubes joined by van der Waals attractive force therebetween. The carbon nanotube structure can be a substantially pure structure of carbon nanotubes, with few impurities. The carbon nanotube structure can be a freestanding structure, that is, the carbon nanotube structure can be supported by itself without a substrate. For example, if at least one point of the carbon nanotube structure is held, the entire carbon nanotube structure can be lifted while remaining its structural integrity.

The carbon nanotubes in the carbon nanotube structure can be orderly or disorderly arranged. The term 'disordered carbon nanotube structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube structure can be isotropic, namely the carbon nanotube structure has properties identical in all directions of the carbon nanotube structure. The carbon nanotubes in the disordered carbon nanotube structure can be entangled with each other.

The carbon nanotube structure including ordered carbon nanotubes is an ordered carbon nanotube structure. The term 'ordered carbon nanotube structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure can be selected from single-walled, double-walled, and/or multi-walled carbon nanotubes. The carbon nanotube structure can include at least one carbon nanotube film. In other embodiments, the carbon nanotube structure is composed of one carbon nanotube film or at least two carbon nanotube films. In other embodiment, the carbon nanotube structure consists one carbon nanotube film or at least two carbon nanotube films.

Figure 3:
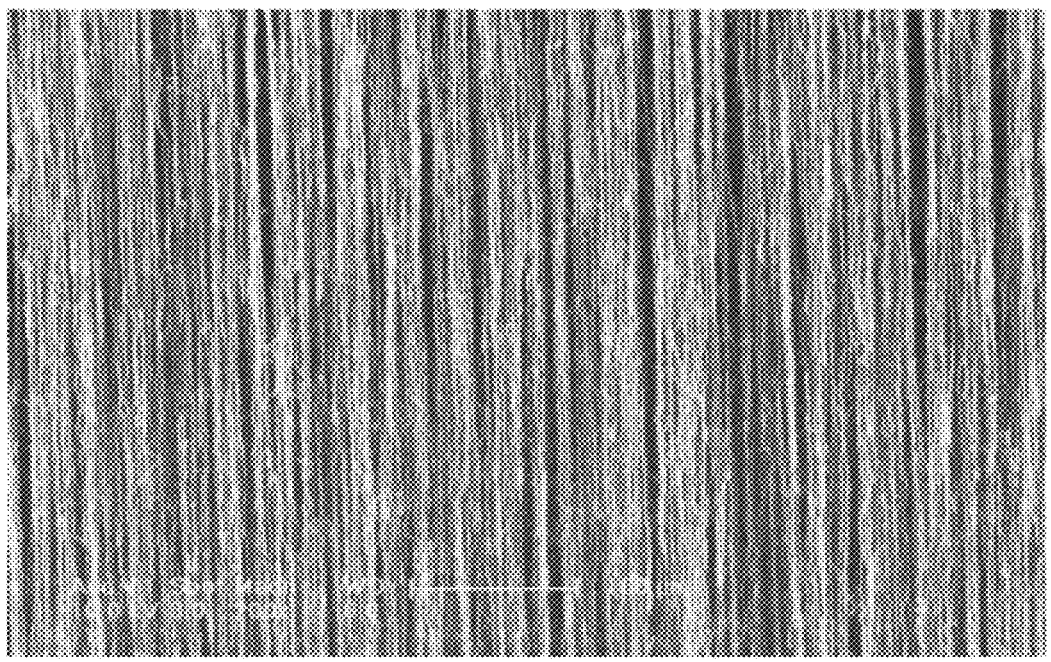
FIG. 3 shows a Scanning Electron Microscope (SEM) image of a drawn carbon nanotube film.

In one embodiment, the carbon nanotube film can be a drawn carbon nanotube film. Referring to FIG. 3, the drawn carbon nanotube film includes a number of successive and oriented carbon nanotubes joined end-to-end by van der Waals attractive force therebetween. The drawn carbon nanotube film is a freestanding film. Each drawn carbon nanotube film includes a number of successively oriented carbon nanotube segments joined end-to-end by van der Waals attractive force therebetween. Each carbon nanotube segment includes a number of carbon nanotubes substantially parallel to each other, and joined by van der Waals attractive force therebetween. Some variations can occur in the drawn carbon nanotube film. The carbon nanotubes in the drawn carbon nanotube film are oriented along a preferred orientation. The drawn carbon nanotube film can be treated with an organic solvent to increase the mechanical strength and toughness of the drawn carbon nanotube film and reduce the coefficient of friction of the drawn carbon nanotube film. The thickness of the drawn carbon nanotube film can range from about 0.5 nanometers to about 100 micrometers. The drawn carbon nanotube structure can be used as a carbon nanotube structure directly.

The carbon nanotubes in the drawn carbon nanotube structure can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers. The lengths of the carbon nanotubes can range from about 200 micrometers to about 900 micrometers.

The carbon nanotube structure can include at least two stacked drawn carbon nanotube films. The carbon nanotubes in the drawn carbon nanotube film are aligned along one preferred orientation, an angle can exist between the orientations of carbon nanotubes in adjacent drawn carbon nanotube films, whether stacked or adjacent. An angle between the aligned directions of the carbon nanotubes in two adjacent drawn carbon nanotube films can range from about 0 degrees to about 90 degrees (e.g. about 15 degrees, 45 degrees or 60 degrees).

Figure 4:
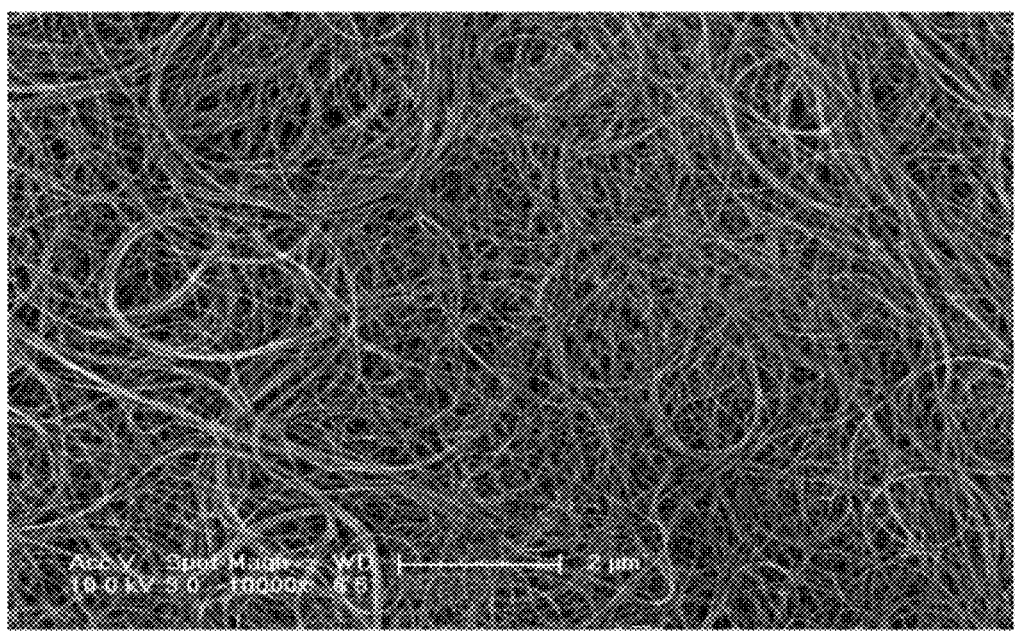
FIG. 4 shows an SEM image of a flocculated carbon nanotube film.

In other embodiments, the carbon nanotube film can be a flocculated carbon nanotube film. Referring to FIG. 4, the flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. Because the carbon nanotubes in the carbon nanotube structure are entangled with each other, the carbon nanotube structure employing the flocculated carbon nanotube film has excellent durability, and can be fashioned into desired shapes with a low risk to the integrity of the carbon nanotube structure. The thickness of the flocculated carbon nanotube film can range from about 0.5 nanometers to about 1 millimeter.

Figure 5:
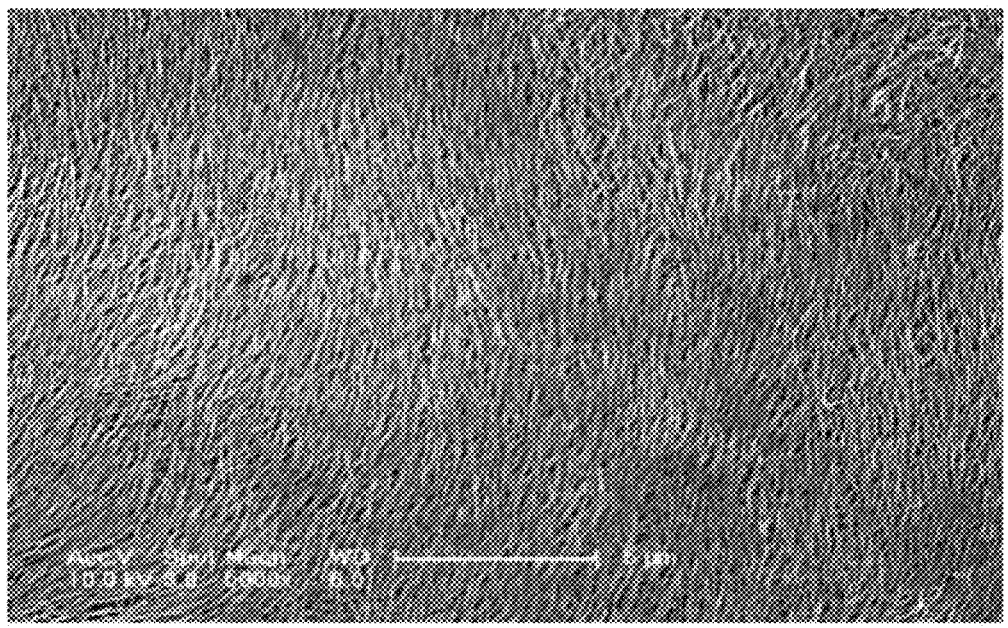
FIG. 5 shows an SEM image of a pressed carbon nanotube film.

Referring to FIG. 5, in other embodiments, the carbon nanotube film can be a pressed carbon nanotube film. The pressed carbon nanotube film is formed by pressing a carbon nanotube array. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. In one embodiment, the carbon nanotubes in the pressed carbon nanotube film are arranged along different directions, the carbon nanotube structure can be isotropic. The thickness of the pressed carbon nanotube film can range from about 0.5 nanometers to about 1 millimeter.

Figure 6:
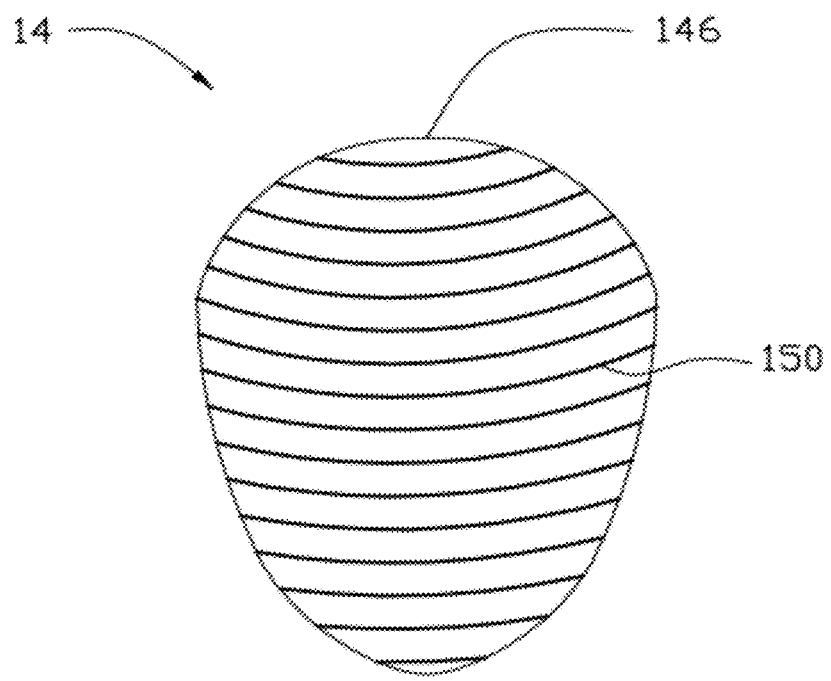
FIG. 6 is a schematic view of an inputting end including a carbon nanotube wire structure located on a surface of a supporting structure according to one embodiment.
Figure 7:
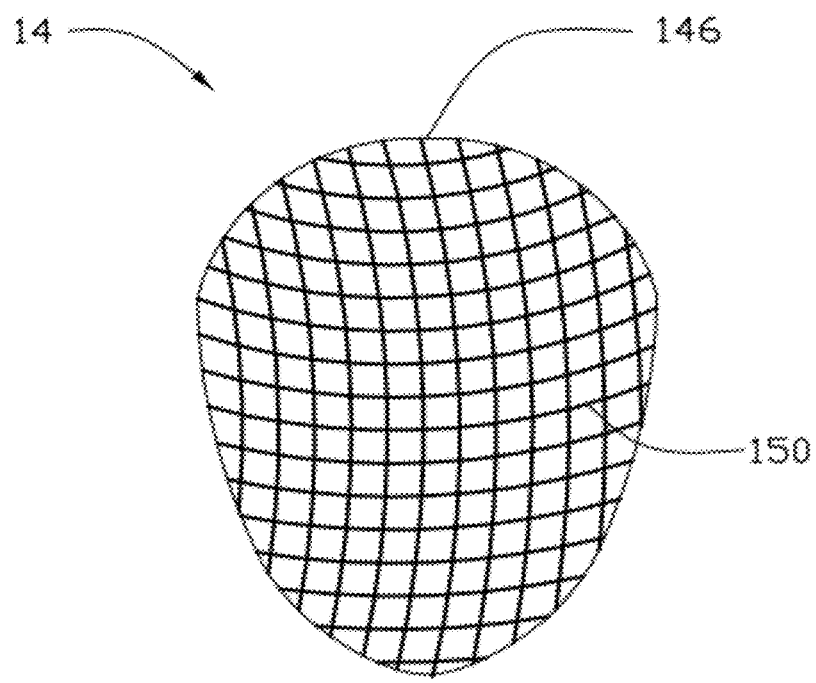
FIG. 7 is a schematic view of an inputting end including a plurality of carbon nanotube wire structures located on a surface of a supporting structure according to one embodiment.

In some embodiments, the carbon nanotube structure can include at least one carbon nanotube wire structure located on surface of the supporter 146. Referring to FIG. 6, in one embodiment, the carbon nanotube structure is composed of a single carbon nanotube wire structure 160, the carbon nanotube wire structure 150 can be twisted around the surface of the supporter 146. Referring to FIG. 7, in other embodiments, the carbon nanotube structure is composed of a plurality of carbon nanotube wire structures 150, the plurality of carbon nanotube wire structures 150 can be crossed with each other or woven with each other to form a net structure, the net structure covers the surface of the supporter 146. The carbon nanotube wire structure 160 includes a plurality of carbon nanotubes joined end to end by van der Waals attractive force therebetween. The carbon nanotube wire structure 150 can be a substantially pure structure of carbon nanotubes, with few impurities. The carbon nanotube wire structure 150 can be a freestanding structure. The carbon nanotubes in the carbon nanotube wire structure can be selected from single-walled, double-walled, and/or multi-walled carbon nanotubes. A diameter of the carbon nanotube wire structure can be in a range from about 10 nanometers to about 1 micrometer.

Figure 8:
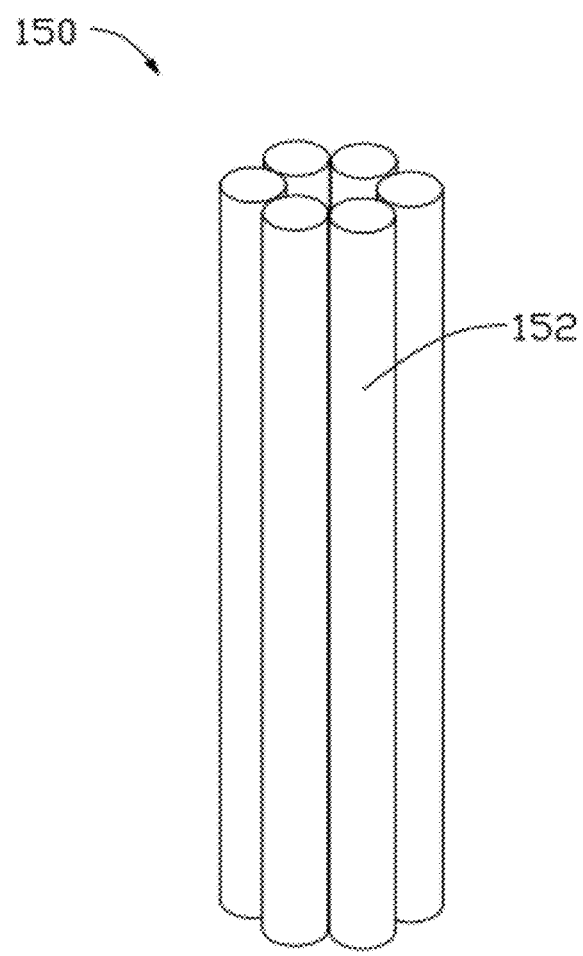
FIG. 8 is a schematic view of a carbon nanotube wire structure including a plurality of carbon nanotube wires parallel with each other in one embodiment.
Figure 9:
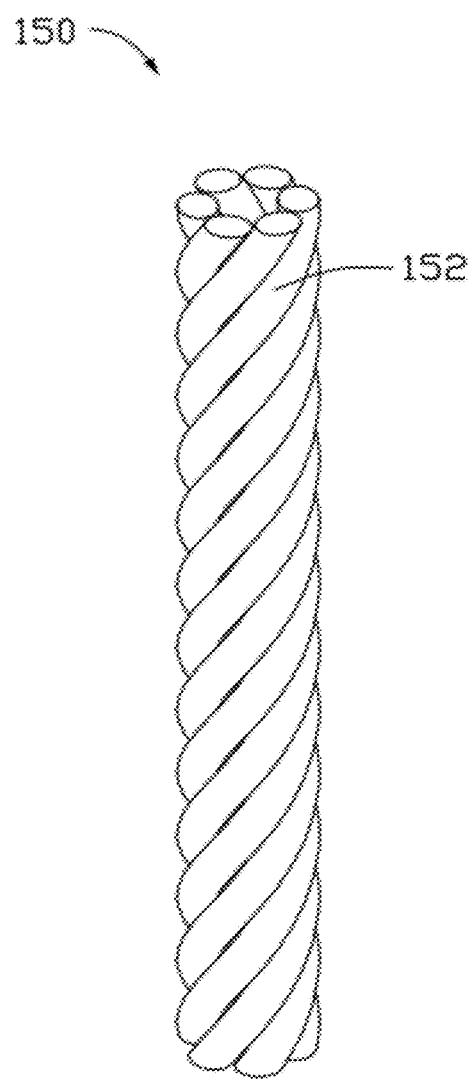
FIG. 9 is a schematic view of a carbon nanotube wire structure including a plurality of carbon nanotube wires twisted with each other in one embodiment.

The carbon nanotube wire structure 150 includes at least one carbon nanotube wire. The carbon nanotube wire includes a plurality of carbon nanotubes. The carbon nanotube wire can be a pure wire structure of carbon nanotubes. The carbon nanotube wire includes a plurality of pores defined by adjacent carbon nanotubes. Size of the pores is less than 10 micrometers. Referring to FIG. 8, the carbon nanotube wire structure 150 can include a plurality of carbon nanotube wires 152 parallel with each other. The plurality of carbon nanotube wires 152 can be fixed together via adhesive. Referring to FIG. 9, in other embodiments, the carbon nanotube wire structure 150 can include a plurality of carbon nanotube wires 152 twisted with each other.

Figure 10:
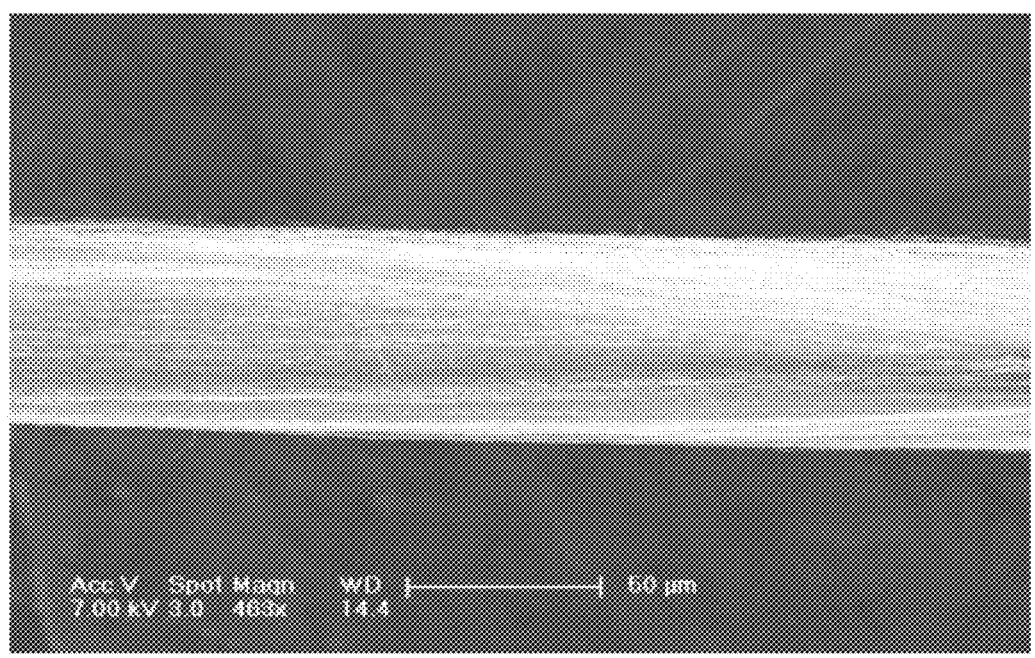
FIG. 10 is an SEM image of an untwisted carbon nanotube wire.

The carbon nanotube wire 152 can be untwisted or twisted. Referring to FIG. 10, the untwisted carbon nanotube wire includes a plurality of carbon nanotubes substantially oriented along a same direction (i.e., a direction along the length direction of the untwisted carbon nanotube wire). The untwisted carbon nanotube wire can be a pure structure of carbon nanotubes. The untwisted carbon nanotube wire can be a freestanding structure. The carbon nanotubes are substantially parallel to the axis of the untwisted carbon nanotube wire. In one embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 50 nanometers to about 100 micrometers.

Figure 11:
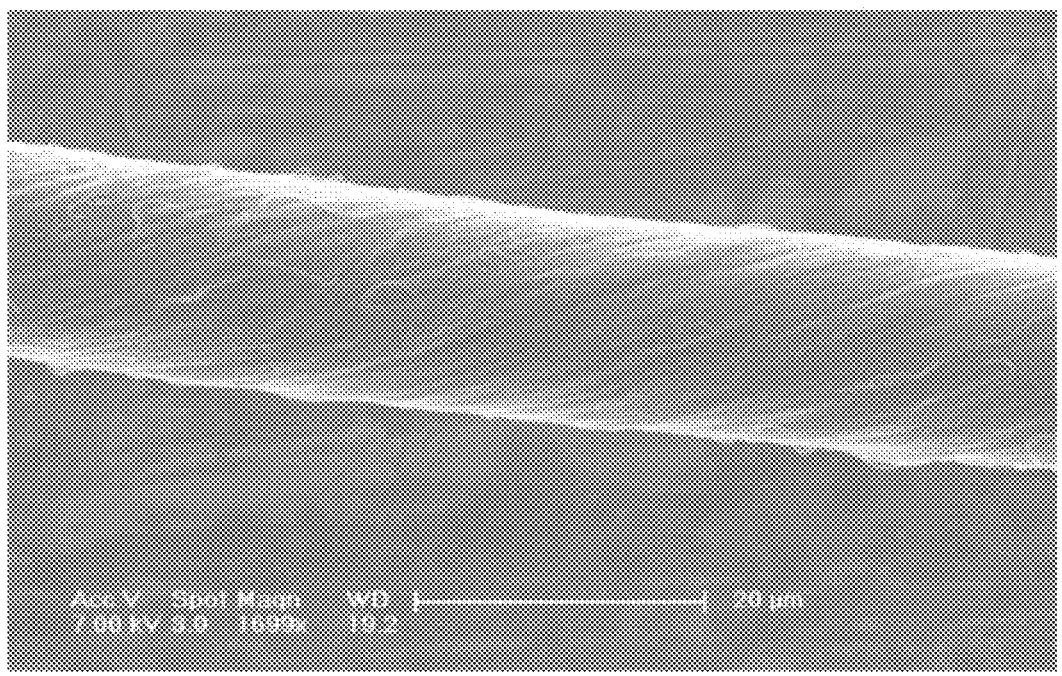
FIG. 11 is an SEM image of twisted carbon nanotube wire.

Referring to FIG. 11, the twisted carbon nanotube wire includes a plurality of carbon nanotubes helically oriented around an axial direction of the twisted carbon nanotube wire. The twisted carbon nanotube wire can be a pure structure of carbon nanotubes. The twisted carbon nanotube wire can be a freestanding structure. In one embodiment, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The length of the carbon nanotube wire can be set as desired. A diameter of the twisted carbon nanotube wire can be from about 50 nanometers to about 100 micrometers. Furthermore, the twisted carbon nanotube wire can be treated with a volatile organic solvent after being twisted. After being soaked by the organic solvent, the adjacent substantially parallel carbon nanotubes in the twisted carbon nanotube wire will bundle together, due to the surface tension of the organic solvent when the organic solvent volatilizes. The density and strength of the twisted carbon nanotube wire will increase.

The conductive layer 148 can be a carbon nanotube composite structure. The carbon nanotube composite structure is a composite structure of the carbon nanotube structure and a conductive material. The conductive material can be metal or alloy. The metal can be copper, silver or gold. The conductive material is coated on surface of each carbon nanotube of the carbon nanotube structure to form a coating layer. A thickness of the coating layer can be in a range from about 1 nanometer to about 20 nanometers. Because the thickness of the coating layer is very thin, the carbon nanotube composite structure includes a plurality of pores defined by adjacent carbon nanotubes coated with the coating layer. The size of the pores is less than 5 millimeters. In one embodiment, the coating layer is made of silver material, and the thickness of the coating layer is about 5 nanometers.

In other embodiments, a middle layer can be located between the carbon nanotube and the coating layer. The middle layer has good wetting property with the carbon nanotube, and can combine tightly with the carbon nanotube. The coating layer is located on an outer surface of the middle layer. A material of the middle layer can be nickel, palladium or titanium. A thickness of the middle layer can be in a range from about 4 nanometers to about 10 nanometers.

The carbon nanotube composite structure has good conductivity and can quickly transmit current. As such, if the carbon nanotube composite structure is used as the conductive layer 148 of the inputting end 14, the inputting fingertip sleeve 10 can have a high reaction speed.

Figure 12:
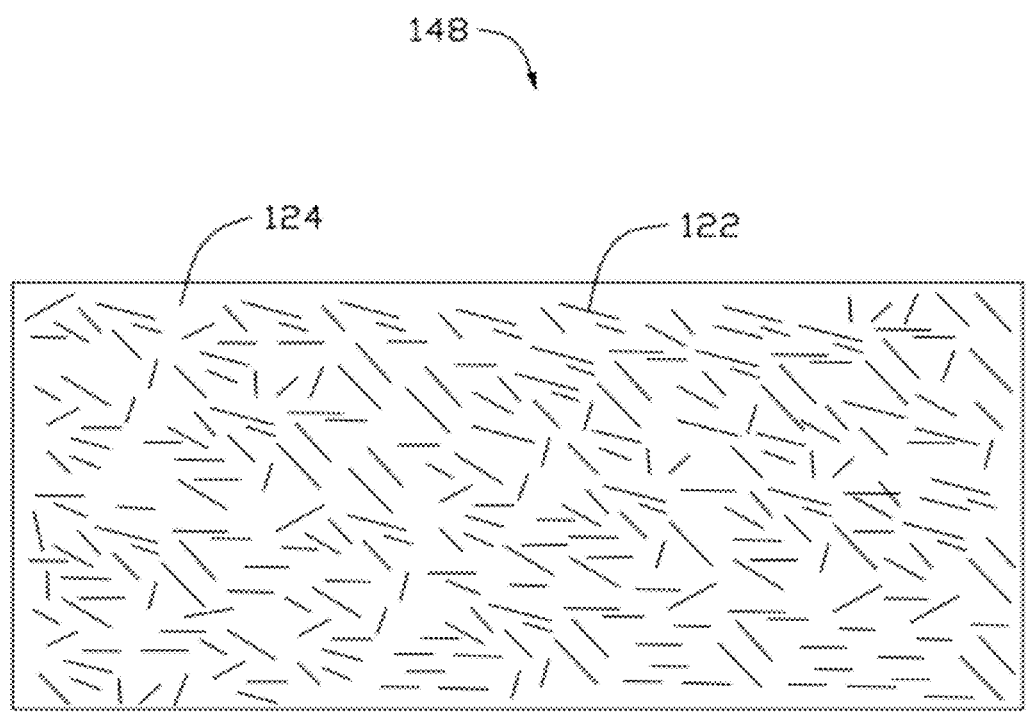
FIG. 12 is a schematic view of a carbon nanotube/polymer composite structure used in the conductive layer in one embodiment.

Referring to FIG. 12, the conductive layer 148 can be a carbon nanotube/polymer composite structure. The carbon nanotube/polymer composite structure includes a polymer matrix 124 and a plurality of carbon nanotubes 122 dispersed in the polymer matrix 124. The plurality of carbon nanotubes 122 is connected with each other to form a conductive structure. The carbon nanotube/polymer structure has good flexibility. If the carbon nanotube/polymer structure is used as the conductive layer 148, the inputting end 14 has a long life.

The polymer matrix 124 is made of polymer. Examples of available polymers are cellulose, polyethylene, polypropylene, polystyrene, polyvinyl chloride (PVC), epoxy resin, phenol formaldehyde resin, silica gel, silicon rubber, polyester, polyethylene terephthalate (PET), polymethyl methacrylate (PMMA) and combinations thereof. In one embodiment, the polymer matrix 124 is silicon rubber.

In some embodiments, in the polymer matrix 124, the carbon nanotubes can combine with each other to form the carbon nanotube structure as disclosed above. The polymer matrix 124 and the carbon nanotube structure can form a layer-shaped carbon nanotube/polymer composite structure or a linear carbon nanotube/polymer composite structure.

Figure 13:
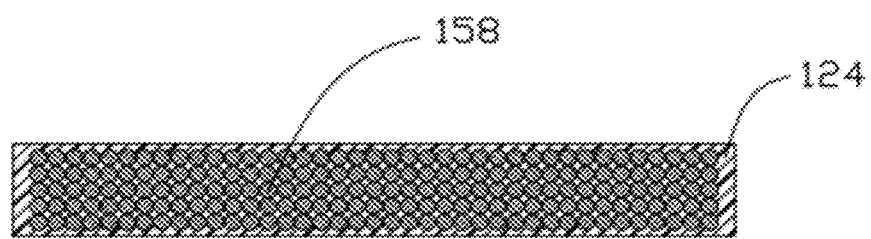
FIG. 13 is a schematic view of a layer-shaped carbon nanotube/polymer composite structure including a polymer matrix and a layer-shaped carbon nanotube structure.
Figure 14:
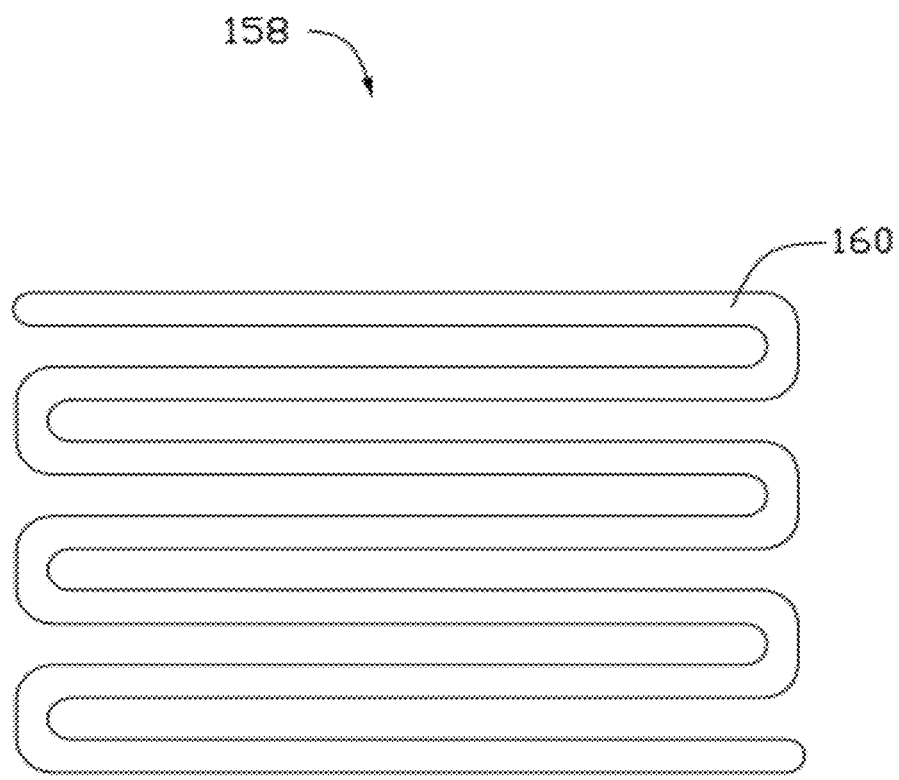
FIG. 14 is a schematic view of a layer-shaped carbon nanotube structure including one single carbon nanotube wire structure.

Referring to FIG. 13, the layer-shaped carbon nanotube/polymer composite structure can include the polymer matrix 124 and a layer-shaped carbon nanotube structure 158 having a plurality of micropores. In one example, the polymer matrix 124 is dispersed in the micropores of the layer-shaped carbon nanotube structure 158. Some carbon nanotubes of the layer-shaped carbon nanotube structure 158 can protrude from the polymer matrix 124. In another example, the layer-shaped carbon nanotube structure 158 is enclosed within the polymer matrix 124. The polymer matrix 124 is covered on surfaces of the layer-shaped carbon nanotube structure. A thickness of the polymer matrix 124 covered on the layer-shaped carbon nanotube structure is less than 10 millimeters. Because the thickness is very thin, surfaces of the carbon nanotube/polymer composite structure is conductive. The layer-shaped carbon nanotube structure 158 can include at least one carbon nanotube film, at least one carbon nanotube wire structure or combination thereof. When the layer-shaped carbon nanotube structure 158 includes a plurality of carbon nanotube films, the plurality of carbon nanotube films are stacked on each other. In one embodiment, the layer-shaped carbon nanotube structure 158 includes a single carbon nanotube wire structure 160, the single carbon nanotube wire structure 160 can be folded to obtain a layer-shape structure as shown in FIG. 14.

Figure 15:
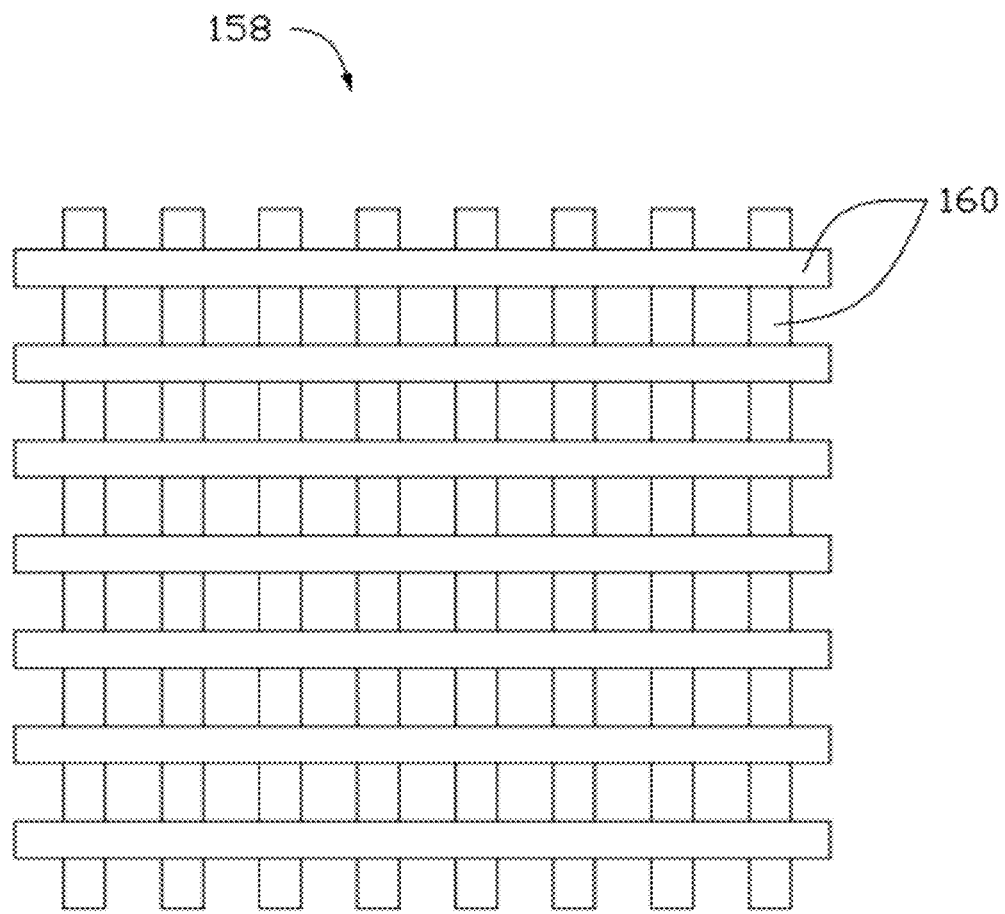
FIG. 15 is a schematic view of a layer-shaped carbon nanotube structure including a plurality of carbon nanotube wire structures crossed with each other.
Figure 16:
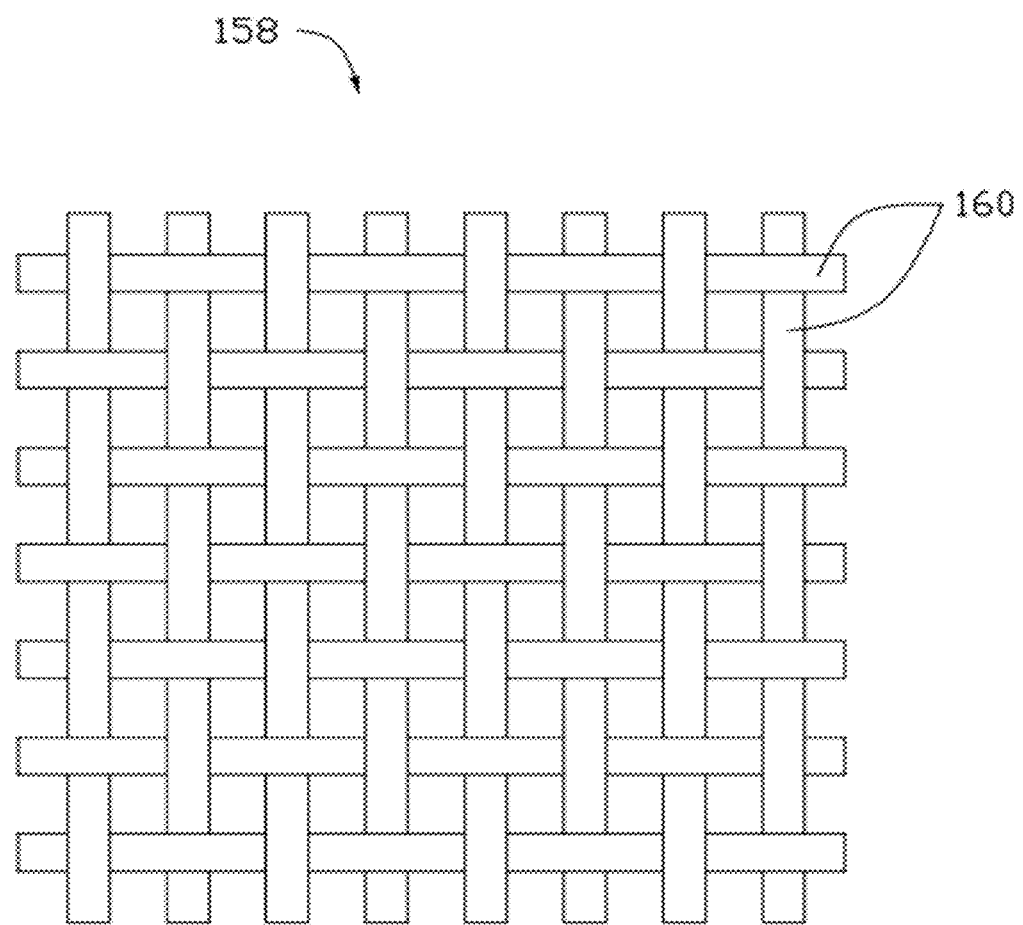
FIG. 16 is a schematic view of a layer-shaped carbon nanotube structure including a plurality of carbon nanotube wire structures woven with each other.

In another embodiment, the layer-shaped carbon nanotube structure 158 includes a plurality of carbon nanotube wire structures 150, the carbon nanotube wire structures 150 can be parallel with each other (not shown), crossed with each other as shown in FIG. 15 or weaved together as shown in FIG. 16 to obtain a layer-shaped structure.

Figure 17:
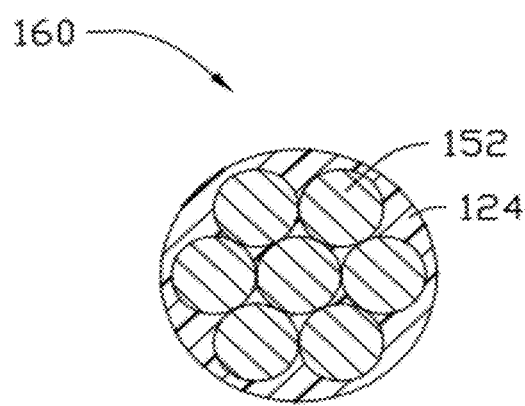
FIG. 17 is a schematic view of a linear carbon nanotube/polymer composite structure including one carbon nanotube wire structure and a polymer matrix, wherein the carbon nanotube wire structure is embedded in the polymer matrix.
Figure 18:
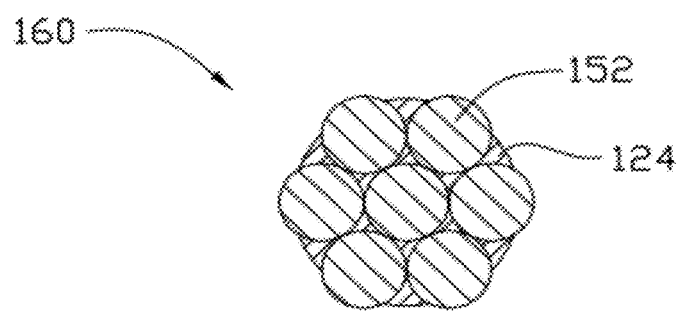
FIG. 18 is a schematic view of a linear carbon nanotube/polymer composite structure including one carbon nanotube wire structure and a polymer matrix, wherein the polymer matrix is filled in micropores of the carbon nanotube wire structure.

The linear carbon nanotube/polymer composite structure can include the polymer matrix 124 and one carbon nanotube wire structure 160. The carbon nanotube wire structure 160 includes at least one carbon nanotube wire. In one example according to FIG. 17, the carbon nanotube wire structure 160 including a plurality of carbon nanotube wires 152 is enclosed within the polymer matrix 124, the polymer matrix 124 is coated on surface of the carbon nanotube wire structure 150, and the polymer matrix 124 is filled in micropores of the carbon nanotube wire structure 150. A thickness of the polymer matrix 124 coated on surface of the carbon nanotube wire structure 160 can be less than 10 millimeters. Because the polymer matrix 124 coated on surface of the carbon nanotube wire structure 160 is very thin, the surface of the linear carbon nanotube/polymer composite structure is conductive. Referring to FIG. 18, in another example, the polymer matrix 124 is dispersed in the micropores of the carbon nanotube wire structure 160 and in the gaps defined by adjacent carbon nanotube wires 152. Some carbon nanotubes of the carbon nanotube wire structure 160 protrude from the polymer matrix 124.

Figure 19:
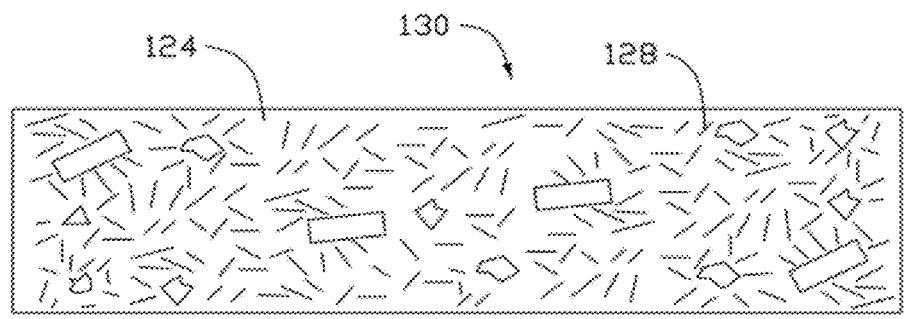
FIG. 19 is schematic view of a graphene composite structure.

Referring to FIG. 19, in another embodiment, the conductive layer can be a graphene/polymer composite layer 130. The graphene/polymer composite layer 130 includes a polymer matrix 124 and a plurality of graphenes 128 dispersed in the polymer matrix 124. Some of the graphenes 128 can protrude from the polymer matrix 124. The plurality of graphenes 128 can contact with each other to form a conductive structure. A weight percentage of the plurality of graphenes 128 is in a range from about 10% to about 60%. A thickness of the graphene 128 is in a range from about 0.5 nanometers to about 100 nanometers. The polymer matrix 124 can be flexible.

Figure 20:
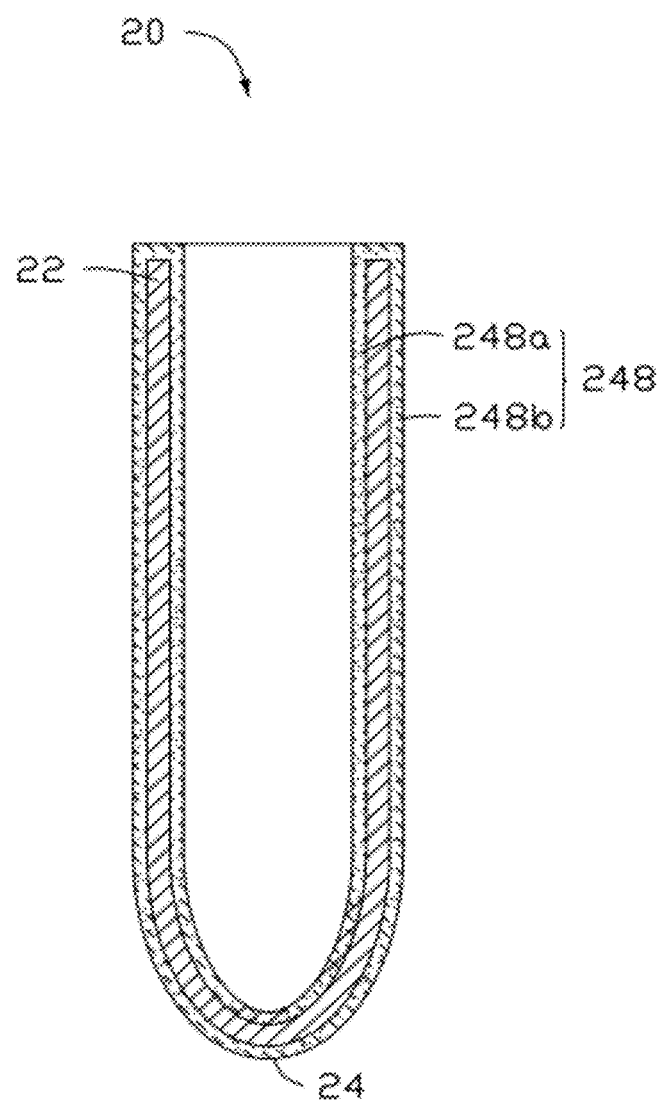
FIG. 20 is a schematic sectional view of an inputting fingertip sleeve according to one embodiment.

Referring to FIG. 20, an inputting fingertip sleeve 20 is provided according to another embodiment. The inputting fingertip sleeve 20 includes a sleeve 22. The sleeve 22 includes at least one opening (not labeled) configured to receive a finger and a close end (not labeled). The sleeve 22 has a tubular structure. A shape of close end can be hemisphere, tapered or half-ellipsoid. The sleeve 22 includes an inner surface (not labeled) and an outer surface (not labeled). The inputting fingertip sleeve 20 further includes a first conductive layer 248a and a second conductive layer 248b. The first conductive layer 248a is located on the inner surface of the sleeve 22, and the second conductive layer 248b is located on the outer surface of the sleeve 22. The first conductive layer 248a is electrically connected with the second conductive 248b. The second conductive layer 248b includes the carbon structure. A material of the first conductive layer 248a can be metal, alloy or conductive polymer. The material of the first conductive layer 248a can also include the carbon structure. The material of the first conductive 248a and the second conductive layer 248b can be same. In some embodiments, as seen in FIG. 20, the second conductive layer 248b covers the whole outer surface, the first conductive layer 248a covers the whole inner surface. The first conductive layer 248a and the second conductive 248b join with each other at the opening to form an integrated conductive layer 248. The conductive layer 248 covers the whole inner surface and the whole outer surface, thus the sleeve 22 is wrapped by the conductive layer 248.

A part of second conductive layer 248b covering the close end of the sleeve 22 is an inputting end 24. In use of the inputting fingertip 20, the user inserts a finger into the sleeve 22 via the opening, and contacts with the first conductive layer 248a in the inner surface. The second conductive layer 248b is electrically connected with the first conductive layer 248a, as such, the finger can be electrically connected with the inputting end 24 when the finger is put in the inputting fingertip sleeve 20.

Figure 21:
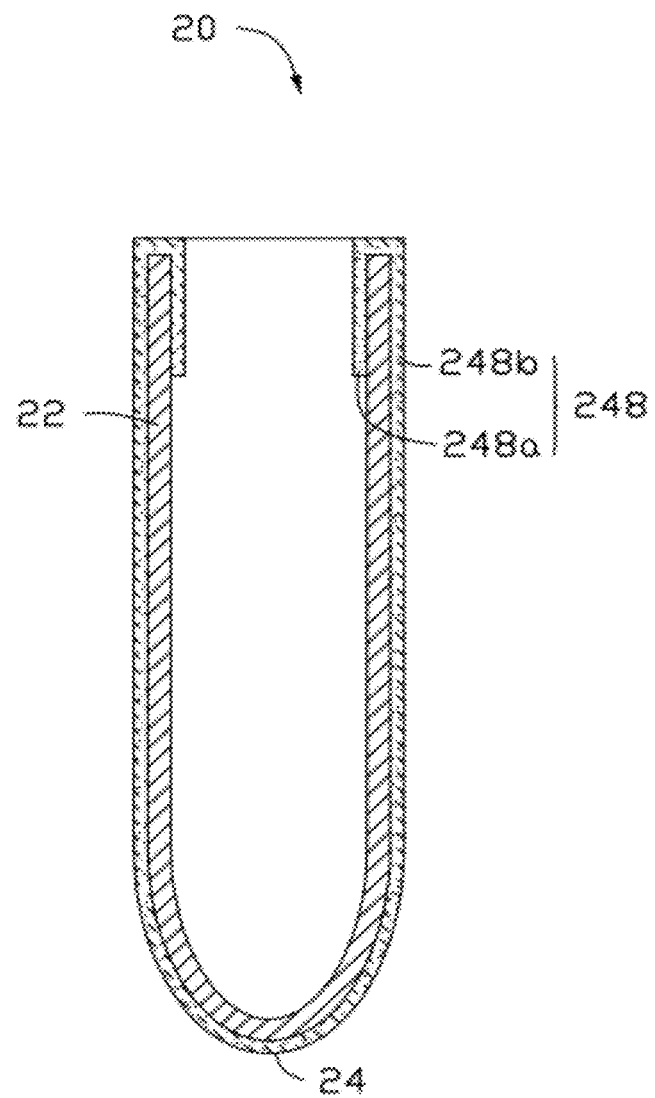
FIG. 21 is a schematic sectional view of an inputting fingertip sleeve according to one embodiment.

In another embodiment according to FIG. 21, the conductive layer 248 covers the whole outer surface of the tubular structure and part inner surface of the tubular structure. The first conductive layer 248b covers a part of the inner surface, and the second conductive layer 248a covers the whole outer surface. The conductive layer 248 is a successive layer. The conductive layer 248 folds at the open end of the tubular structure onto the inner surface of the tubular structure.

Figure 22:
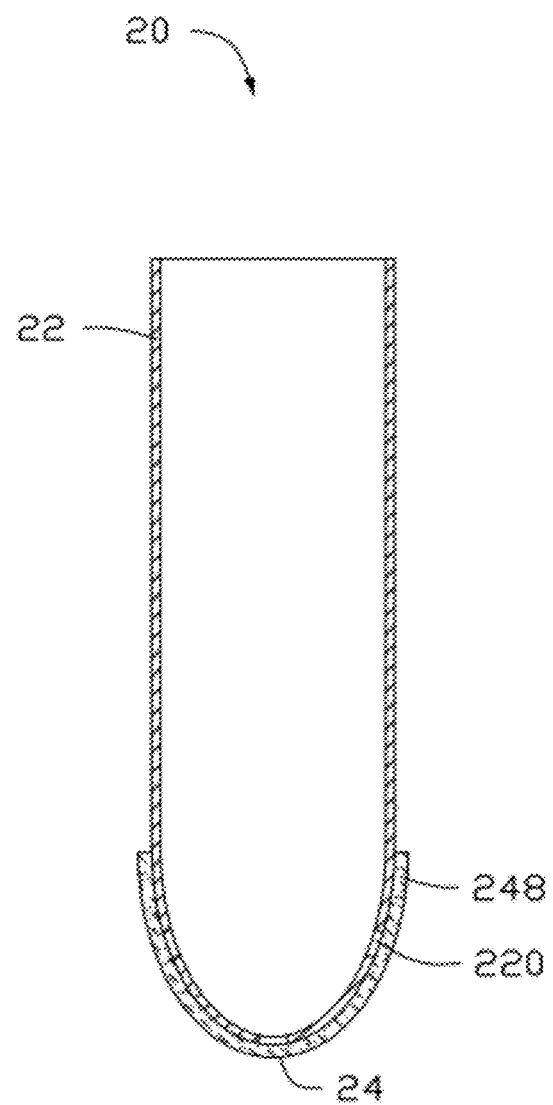
FIG. 22 is a schematic sectional view of an inputting fingertip sleeve according to one embodiment.

In another embodiment according to FIG. 22, the conductive layer 248 can be covered on the close end of the tubular structure and located on the outer surface of the sleeve 22, the other part of the sleeve 22 is free of the conductive layer 248. The close end of the sleeve 22 includes at least one through hole 220 located between the inner surface of the sleeve 22 and the outer surface of sleeve 22. The close end of the sleeve 22 can include a plurality of through holes 220. In the embodiment shown in FIG. 22, there are three through holes 220 located at the close end. In use of the inputting fingertip sleeve 20 disclosed in FIG. 22, the finger 100 gets into the sleeve 22 and is electrically connected with the conductive layer 248 through the at least one through holes 220. In other embodiments, the inputting fingertip sleeve can further include at least one conducive element (not shown) located in the at least one through hole 220. The at least one conductive element is electrically connected with the conductive layer 248. In yet other embodiments, the at least one conductive element includes a plurality of conductive elements, and the at least one through hole includes a plurality of through holes. The plurality of conductive elements is located in the plurality of through holes in a one by one manner. A material of the conductive element can be metal, alloy or conductive polymer. The material of the conductive element can be the carbon structure.

Figure 23:
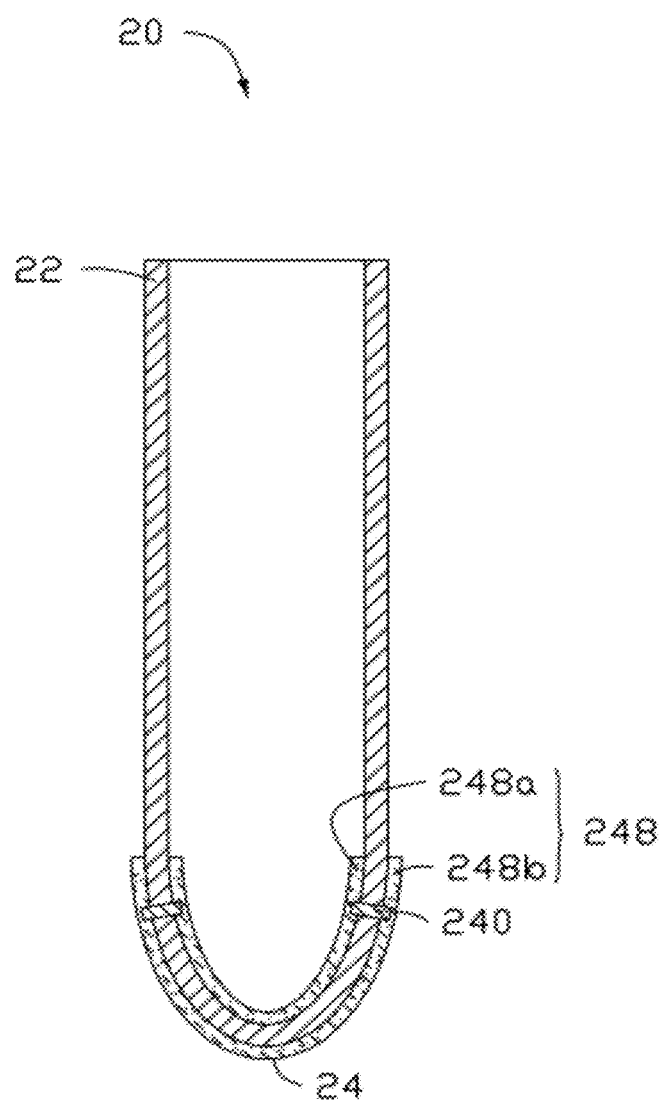
FIG. 23 is a schematic sectional view of an inputting fingertip sleeve according to one embodiment.

Referring to FIG. 23, in yet another embodiment, the first conductive layer 248a is located on the inner surface of the tubular structure, and at the close end. Other part of the inner surface can be free of the conductive layer 248. The second conductive layer 248b is located on the outer surface of the tubular structure and at the close end. Other part of the outer surface can be free of the conductive layer 248. The first conductive layer 248a and the second conductive layer 248b are located at two opposite surfaces of the close end, respectively. The second conductive layer 248b includes the carbon structure. A material of the first conductive layer 248a can be metal, alloy or conductive polymer. The inputting fingertip sleeve 20 further includes at least one conductive element 240 located in the close end and getting through the close end from the inner surface to the outer surface to electrically connect with the first conductive layer 248a and the second conductive layer 248b. The first conductive layer 248a and the second conductive layer 248b are electrically connected with each other via the at least one conductive element 240. The inputting fingertip sleeve 20 can include a plurality of conducive elements 240 located in the close end and electrically connected with the first conductive layer 248a and the second conductive layer 248b. In the embodiment of FIG. 23, there are two conductive elements 240 located in the close end. A material of the conductive element 240 can be metal. A shape of the conductive element 240 is not limited, as long as the conductive element 240 can get through the tubular structure and connects with the first conductive layer 248*a* and the second conductive layer 248*b*. In use of the inputting fingertip sleeve 20 shown in FIG. 23, the finger of the user is inserted into into the tubular structure and contacts the first conductive layer 248*a*, thereby, the finger is electrically connected with the second conductive layer 248*b*.

Characteristics of the conductive layer 248 are similar to the conductive layer 148 as disclosed above. The conductive layer 248 can be fixed on the sleeve by conductive adhesive, mechanical method or heat-pressed method.

Figure 24:
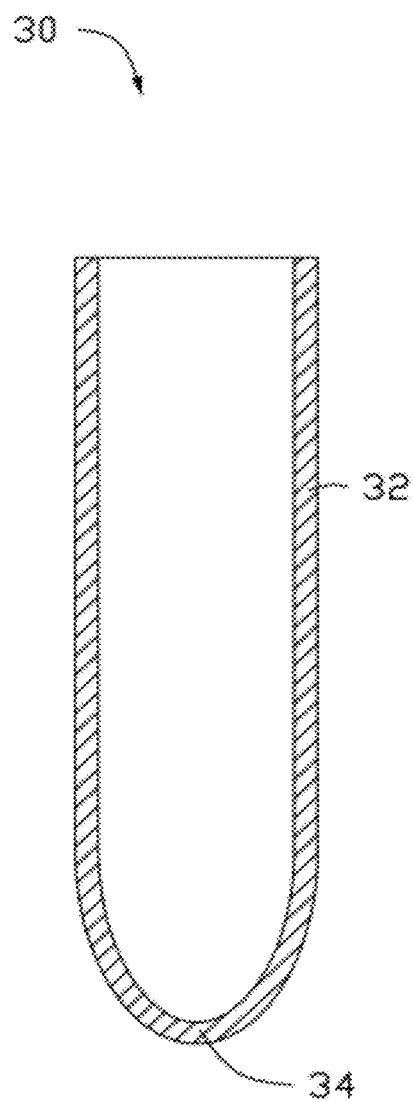
FIG. 24 is a schematic sectional view of an inputting fingertip sleeve according to one embodiment.

Referring to FIG. 24, an inputting fingertip sleeve 30 according to one embodiment is provided. The inputting fingertip sleeve 30 includes a sleeve 32 and an inputting end 34. The sleeve 32 and the inputting end 34 form an integrated structure having a tubular structure. The tubular structure has two opposite ends, one close end and one open end. The close end is the inputting end 34. A shape of the close end can be hemisphere, tapered or half-ellipsoid. A material of the inputting fingertip sleeve 30 can be the carbon structure. In one embodiment, the carbon structure can be elastic. The material of the inputting fingertip sleeve 30 can be the graphene/polymer composite structure, the carbon nanotube structure or the carbon nanotube/polymer composite structure. In one embodiment, the carbon nanotube/polymer composite structure can include a flexible polymer matrix and at least one drawn carbon nanotube film. The drawn carbon nanotube film is flexible along a direction perpendicular with the orientation direction of the carbon nanotubes. When the carbon nanotube/polymer composite structure includes a drawn carbon nanotube film, the carbon nanotube/polymer composite structure is flexible along the direction perpendicular with the orientation direction of the carbon nanotubes. If the carbon nanotube/polymer composite structure includes at least two drawn carbon nanotube films, and adjacent drawn carbon nanotube films are perpendicular with each other, the carbon nanotube/polymer composite structure is flexible. As such, the inputting fingertip sleeve 30 using the carbon nanotube/polymer composite structure can be flexible. The flexible inputting fingertip sleeve 30 can be conveniently put on a finger.

Figure 25:
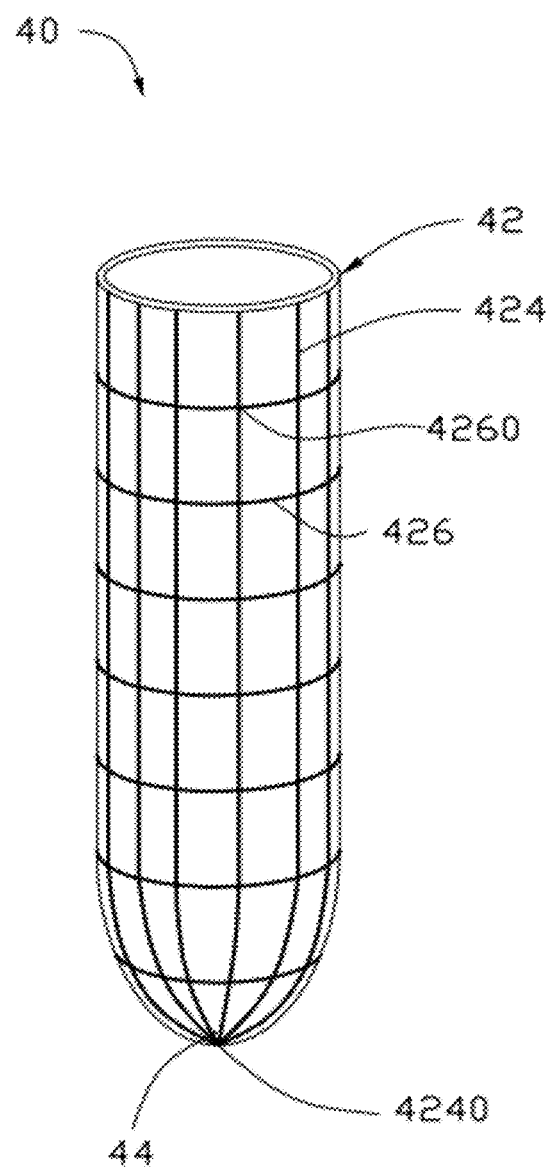
FIG. 25 is a schematic sectional view of an inputting fingertip sleeve according to one embodiment.

Referring to FIG. 25, an inputting fingertip sleeve 40 according to another embodiment is shown. The inputting fingertip sleeve 40 includes an inputting end 44. The inputting fingertip sleeve 40 includes a plurality of first wires 424 and a plurality of second wires 426. The plurality of first wires 424 and the plurality of second wires 426 are crossed with each other to form the sleeve. The sleeve includes at least one opening to receive a finger. The sleeve is used as the inputting fingertip sleeve 40 directly. The first wires 424 are made of conductive materials. The plurality of first wires 424 are converged at one end point 4240. The inputting end 44 includes the end point 4240. The second wires 426 have round structures. The second wires 426 are configured to fix the first wires 424. The plurality of second wires 426 can be parallel with each other. A distance between adjacent second wires 426 can be less than 0.5 centimeters. A perimeter of the second wire 426 can be in a range from about 4 centimeters to about 6 centimeters. The perimeter of the second wire 426 is determined by the finger of the user using the inputting fingertip sleeve 40. The perimeter of the second wire 426 can increase gradually along with an increase of the distance between the end point 4240 and the second wire 426. The second wires 426 can be made of insulative materials. In some embodiments, the material of the second wire 426 is elastic. Each of the first wires 424 is crossed with the plurality of second wires 426 to form a plurality of crossing points 4260. On one second wire 426, a distance between adjacent crossing points 4260 can be less than 0.5 centimeters. The first wire 424 can be fixed at the crossing points via adhesive or mechanical method. Diameter of the first wire 424 or the second wire 426 can be in a range from about 1 micrometer to about 1 millimeter.

The material of the first wires 424 can be metal. In one embodiment, the first wire 424 is the carbon nanotube wire structure as disclosed above. In another embodiment, the first wire 424 is the linear carbon nanotube/polymer composite structure as disclosed above. The material of the second wires 426 can be plastic, nylon, rubber, resin or fiber. In some embodiments, the second wires 426 are made of flexible materials.

Figure 26:
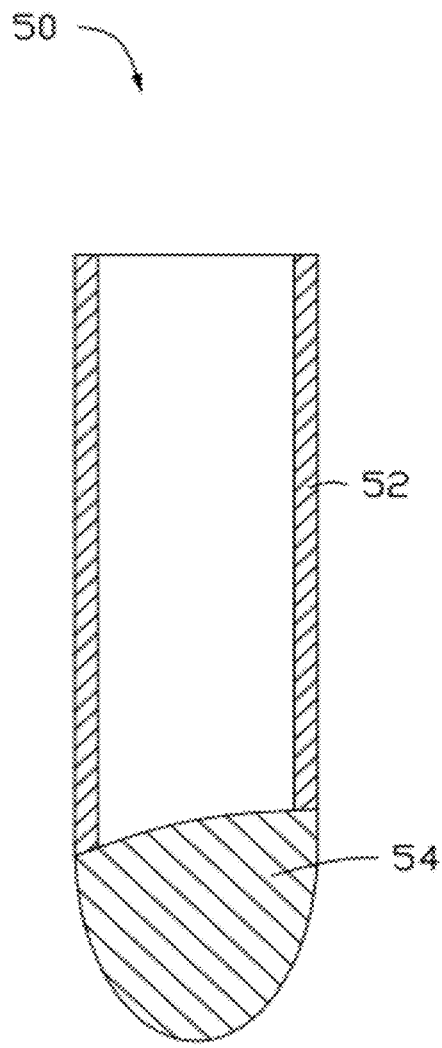
FIG. 26 is a schematic sectional view of an inputting fingertip sleeve according to one embodiment.

Referring to FIG. 26, an inputting fingertip sleeve 50 according to one embodiment is provided. The inputting fingertip sleeve 50 includes a sleeve 52 and an inputting end 54. The inputting end 54 is connected with the sleeve 52. The inputting end 54 is made of conductive materials. A shape of the inputting end 54 can be hemisphere, tapered or half-ellipsoid.

In one embodiment, the inputting end 54 includes a plurality of carbon nanotubes dispersed uniformly. The inputting end 54 can be a pure structure of carbon nanotubes. The plurality of carbon nanotubes can join end to end with each other in the inputting end 54.

In another embodiment, the inputting end 54 can be made of the carbon nanotube/polymer composite structure, the graphene/polymer composite material or combination thereof.

Figure 27:
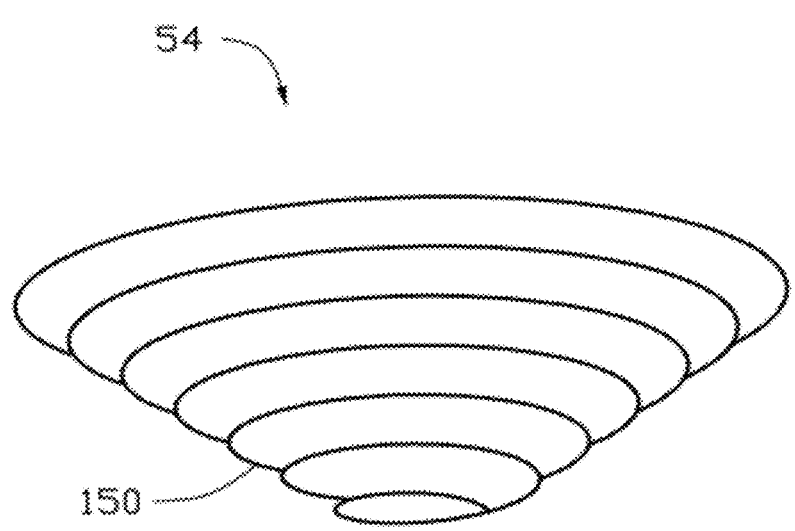
FIG. 27 is a schematic sectional view of an inputting fingertip sleeve including an inputting end composed of a carbon nanotube wire structure.
Figure 28:
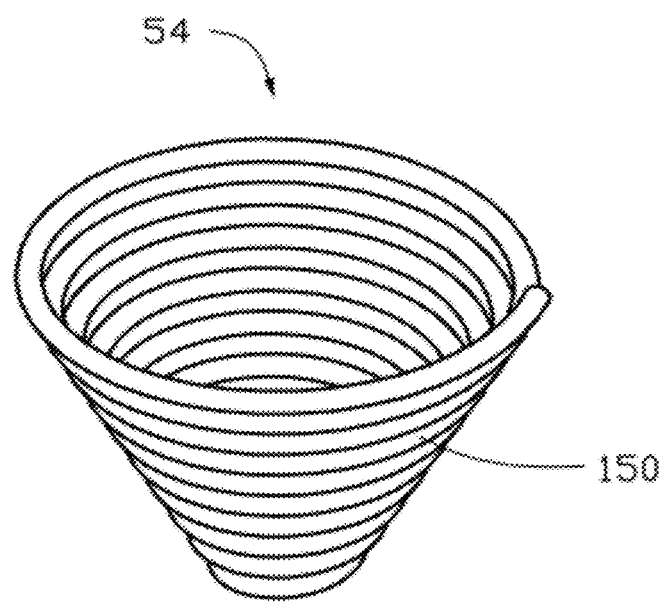
FIG. 28 is a schematic sectional view of an inputting fingertip sleeve including an inputting end composed of a number of carbon nanotube wire structures.

In further another embodiment, the inputting end 54 includes at least one carbon nanotube wire structure. Referring to FIG. 27, the inputting end 54 includes one carbon nanotube wire structure 160, the carbon nanotube wire structure 160 is twisted to form the inputting end 54. The carbon nanotube wire structure 160 spirals to form a plurality of circles having different diameters disposed closely to form an almost tapered-shape. The adjacent circles of the almost tapered-shape can be fixed by adhesive. Referring to FIG. 28, in another embodiment, the inputting end 54 includes a plurality of carbon nanotube wire structures 150. Each of the plurality of carbon nanotube wire structures 150 can form a ring. The plurality of carbon nanotube wire structures 150 forms a plurality of rings having different diameters, and the plurality of rings is disposed side by side to form an almost taper structure. Adjacent carbon nanotube wire structures 150 can combine with each other via adhesive. After the at least one carbon nanotube wire structure 160 forms the inputting end 54, the at least one carbon nanotube wire structure 160 can be heated to a temperature from about 600° C. to about 2000° C. under vacuum or a protecting gas. After that, the at least one carbon nanotube wire structure 160 will keep the stable shape of the inputting end 54. Therefore, the inputting end 54 can be composed of the at least one carbon nanotube wire structure 160 without adhesive.

Figure 29:
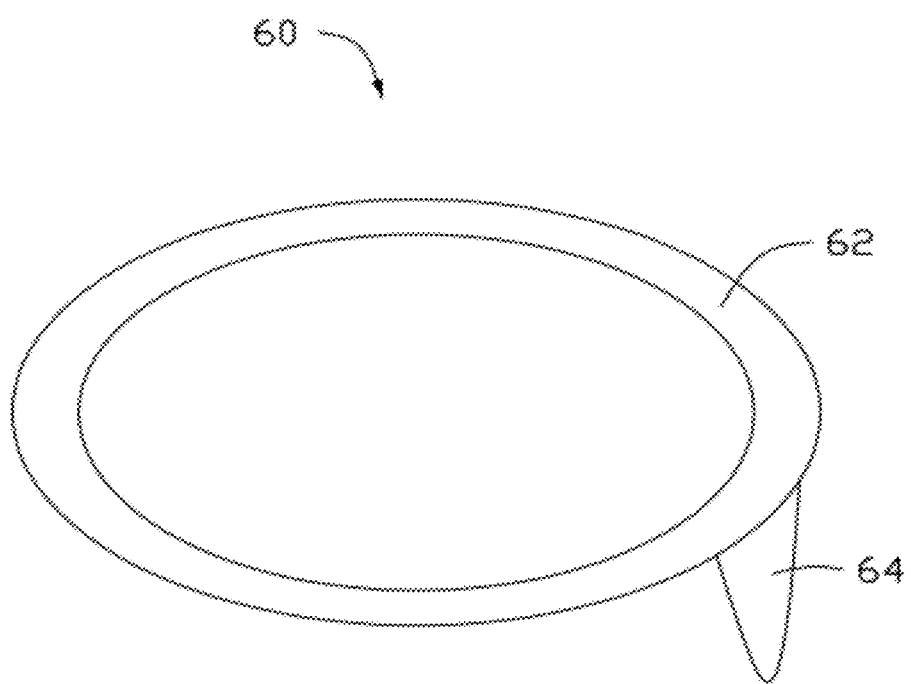
FIG. 29 is a schematic sectional view of an inputting fingertip sleeve according to one embodiment.

Referring to FIG. 29, an inputting fingertip sleeve 60 according to one embodiment is provided. The inputting fingertip sleeve 60 includes a sleeve 62 and an inputting end 64.

The sleeve 62 has a curved linear structure, such as a ring structure or a "C" shaped structure. A material of the sleeve 62 is conductive, can be metal, alloy or conductive polymer.

The inputting end 64 is fixed on the sleeve 62 via adhesive or mechanical method. In one embodiment, the inputting end 64 is welded on the sleeve 62. The inputting end 64 is electrically connected with the sleeve 62. The inputting end 64 can have the same characteristics as the inputting end 14 or the inputting end 54.

In use of the inputting fingertip sleeve 60, the inputting fingertip sleeve 60 is put on a finger via the sleeve 62. The finger can be, for example thumb. Because the sleeve 62 is made of conductive material, the finger can be electrically connected with the inputting end 64 via the sleeve 62.

Other characteristics of the inputting fingertip sleeve 60 are the same as the inputting fingertip sleeve 10 as disclosed above.

The inputting fingertip sleeve disclosed above can be used to operate on a capacitive touch panel screen.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. An inputting fingertip sleeve comprising:
a sleeve comprising at least one opening configured to receive a finger;
an inputting end located on the sleeve and comprising a supporter and a conductive layer located on a surface of the supporter, the conductive layer being a carbon nanotube structure, wherein the supporter is surrounded and sealed by the conductive layer, the carbon nanotube structure comprises a plurality of carbon nanotubes, the supporter has a hollow structure, and an outer surface of the conductive layer is configured to electrically connect to the finger received in the sleeve.

2. The inputting fingertip sleeve of claim 1, wherein the plurality of carbon nanotubes in the carbon nanotube structure are joined end-to-end by van der Waals attractive force therebetween.

3. The inputting fingertip sleeve of claim 1, wherein the plurality of carbon nanotubes in the carbon nanotube structure are entangled with each other.

4. The inputting fingertip sleeve of claim 1, wherein the carbon nanotube structure comprises at least two carbon nanotube films stacked on each other.

5. The inputting fingertip sleeve of claim 1, wherein the carbon nanotube structure comprises at least one carbon nanotube wire structure, a diameter of the at least one carbon nanotube wire structure is in a range from 100 nanometers to 1 micrometer.

6. The inputting fingertip sleeve of claim 5, wherein the at least one carbon nanotube wire structure comprises the plurality of carbon nanotubes joined end-to-end.

7. The inputting fingertip sleeve of claim 6, wherein the plurality of carbon nanotubes in the at least one carbon nanotube wire structure are twisted with each other.

8. The inputting fingertip sleeve of claim 1, wherein the carbon nanotube structure is one carbon nanotube wire structure comprising the plurality of carbon nanotubes joined end-to-end, the carbon nanotube wire structure spirals around the surface of the supporter.

9. The inputting fingertip sleeve of claim 1, wherein the carbon nanotube structure comprises a plurality of carbon nanotube wire structures crossed with each other or woven with each other to form a net structure, the net structure covers the surface of the supporter.

10. The inputting fingertip sleeve of claim 1, wherein the sleeve has a tubular shape with two opposite open ends, and the inputting end is fixed at one open end of the sleeve.

11. The inputting fingertip sleeve of claim 10, wherein the inputting end comprises an inner part and an outer part, and the inner part is located in the sleeve.

12. The inputting fingertip sleeve of claim 11, wherein the sleeve comprises an inner surface, and a gap is defined between the inner part and the inner surface.

13. The inputting fingertip sleeve of claim 1, wherein the supporter has liquid material located therein.

14. The inputting fingertip sleeve of claim 13, wherein the supporter is a thin flexible film.

15. The inputting fingertip sleeve of claim 14, wherein the plurality of carbon nanotubes is configured to be in contact with the finger received in the sleeve.

16. The inputting fingertip sleeve of claim 1, wherein the sleeve comprises an inner surface configured to receive the finger, and the conductive layer is configured to be in contact with the inner surface and in direct contact with the finger received in the sleeve.

17. The inputting fingertip sleeve of claim 1, wherein the conductive layer is attached on the entirety of the surface of the supporter.

18. The inputting fingertip sleeve of claim 1, wherein the inputting end is located on the sleeve and configured to be separable from the sleeve.

19. An inputting fingertip sleeve, the inputting fingertip sleeve comprises:
a sleeve, wherein the sleeve defines a first opening and a second opening opposite to the first opening, and the first opening is configured to receive a finger;
an inputting end, wherein the inputting end is located on the second opening, the inputting end is in direct contact with an inner surface of the sleeve and configured to be in direct contact with the finger received in the sleeve; the inputting end comprises a supporter and a conductive layer attached on an outer surface of the supporter, the supporter is surrounded and sealed by the conductive layer; the conductive layer comprises a plurality of carbon nanotubes.

* * * * *